United States Patent [19]

Venema

[11] 4,363,020
[45] Dec. 7, 1982

[54] INTERROGATING SYSTEM FOR REMOTELY MONITORING TIRE AIR PRESSURE

[75] Inventor: Harry J. Venema, Wheaton, Ill.

[73] Assignee: Borg-Warner Corporation, Chicago, Ill.

[21] Appl. No.: 219,299

[22] Filed: Dec. 22, 1980

[51] Int. Cl.³ .................. B60C 23/02; G01S 9/58
[52] U.S. Cl. ................................ 340/58; 73/146.5; 200/61.25; 343/6.8 R; 343/6.5 SS
[58] Field of Search ........ 340/58; 343/5 DD, 5 HM, 343/6.5 R, 6.5 SS, 6.8 R; 200/61.22, 61.25; 73/146.5

[56] References Cited

U.S. PATENT DOCUMENTS

| | | | |
|---|---|---|---|
| 3,723,966 | 3/1973 | Mueller et al. | 340/58 |
| 3,798,642 | 3/1974 | Augenblick et al. | 343/6.5 SS X |
| 3,806,905 | 4/1974 | Strenglein | 340/58 X |
| 3,873,965 | 3/1975 | Garcia | 340/58 |
| 3,911,434 | 10/1975 | Cook | 340/58 X |
| 4,057,783 | 11/1977 | Blanchier | 340/58 |
| 4,064,482 | 12/1977 | Maiach et al. | 340/58 |
| 4,074,227 | 2/1978 | Kalmus | 340/58 |
| 4,157,530 | 6/1979 | Merz | 340/58 |

Primary Examiner—John W. Caldwell, Sr.
Assistant Examiner—Joseph E. Nowicki
Attorney, Agent, or Firm—James E. Tracy

[57] ABSTRACT

The air pressure in a tire is monitored by transmitting an electromagnetic interrogating signal (specifically a radio frequency signal) from the vehicle to a passive transponder, affixed to the wheel on which the tire is mounted, in communication with the air pressure within the tire. When the pressure is normal, a semiconductor diode and an antenna in the transponder will be shielded from radiation and therefore no response will be made to the received interrogating signal. On the other hand, abnormal air pressure in the tire causes the antenna to become unshielded and exposed to the interrogating signal radiated from the transmitter, whereupon the diode reacts to the received signal and develops therefrom a response signal which is retransmitted from the antenna and includes, among other signal components, the second harmonic of the interrogating signal. A receiver, tuned to the second harmonic, produces from the response signal an indication (preferably on the vehicle's dashboard) that the sensed tire air pressure is abnormal.

6 Claims, 4 Drawing Figures

INTERROGATING SYSTEM FOR REMOTELY MONITORING TIRE AIR PRESSURE

BACKGROUND OF THE INVENTION

This invention relates to a monitoring system for remotely sensing the tire air pressure of a vehicle and for providing an indication to the driver whenever the air pressure is abnormal.

Tire air pressure sensing systems have been developed heretofore, but such prior systems are of complex and expensive construction and are not always reliable in operation. In contrast, applicant's unique system is of relatively simple and inexpensive construction and provides accurate and reliable results.

SUMMARY OF THE INVENTION

The invention provides an interrogating system for remotely monitoring the air pressure in a tire mounted on a wheel of a vehicle. The interrogating system comprises a passive transponder which is attached to the wheel and includes a semiconductor diode, an antenna connected to the diode, sensing means for sensing the air pressure within the tire, and shielding means for shielding the antenna from radiation when the sensed air pressure in the tire is within a predetermined desired normal range, the antenna being exposed to radiation when the sensed air pressure is outside of at least one end of the desired normal range. Transmitting means are provided in the vehicle for transmitting electromagnetic radiation to the passive transponder to effectively interrogate the transponder, the diode responding to the received radiation, when the antenna is exposed, and generating a response signal which is retransmitted from the antenna. Finally, the interrogating system comprises receiving means in the vehicle for receiving the response signal and for producing therefrom an output indicating to the driver of the vehicle that the tire air pressure is beyond at least one end of the desired normal range.

DESCRIPTION OF THE DRAWINGS

The features of the invention which are believed to be novel are set forth with particularity in the appended claims. The invention may best be understood, however, by reference to the following description in conjunction with the accompanying drawings in which like reference numbers identify like elements, and in which:

DESCRIPTION OF THE ILLUSTRATED EMBODIMENT

Figure 2:
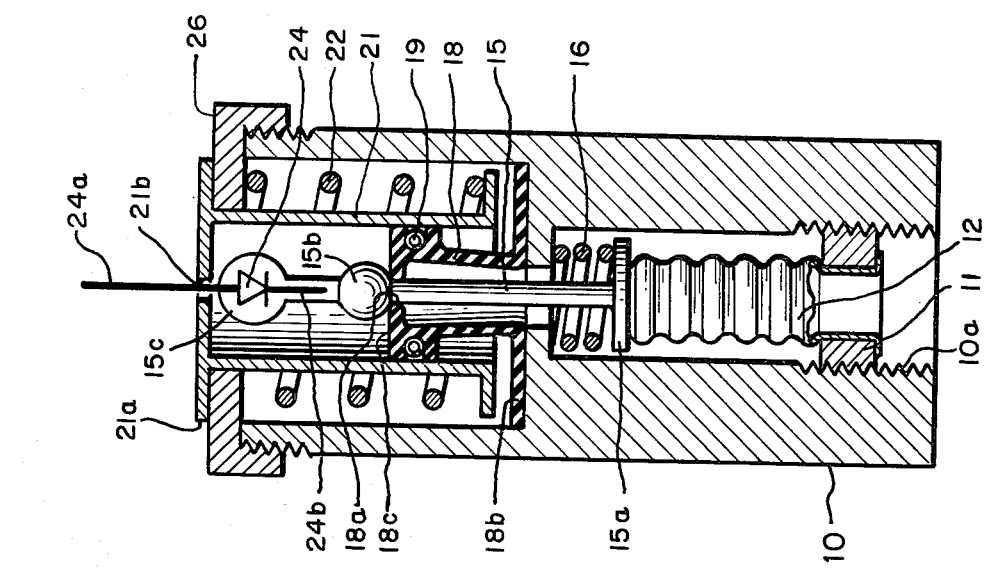
FIGS. 2, 3 and 4 each show the passive transponder, in cross section, under different tire air pressure conditions, FIG. 2 illustrating the transponder when the air pressure is normal, FIG. 3 depicting the transponder when the air pressure is below normal, and FIG. 4 showing the transponder when the air pressure is above normal.
Figure 3:
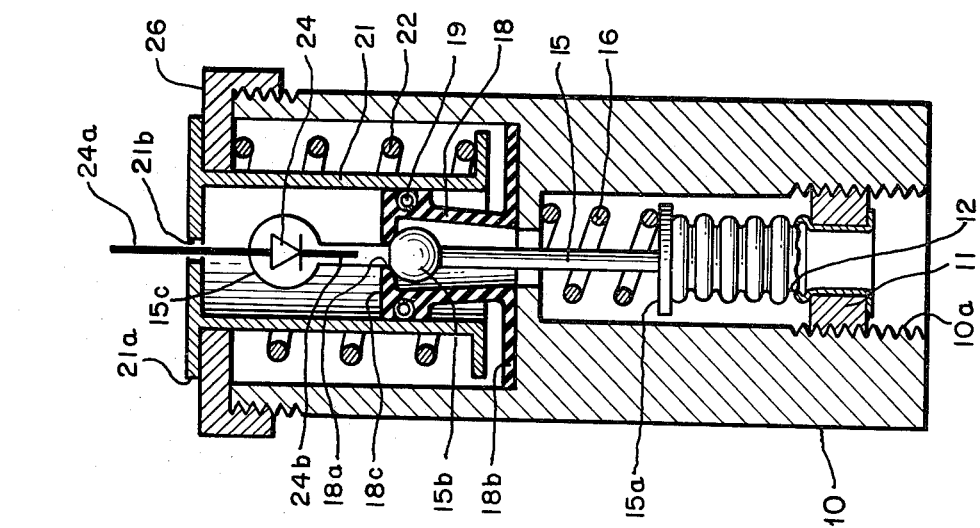
Figure 4:
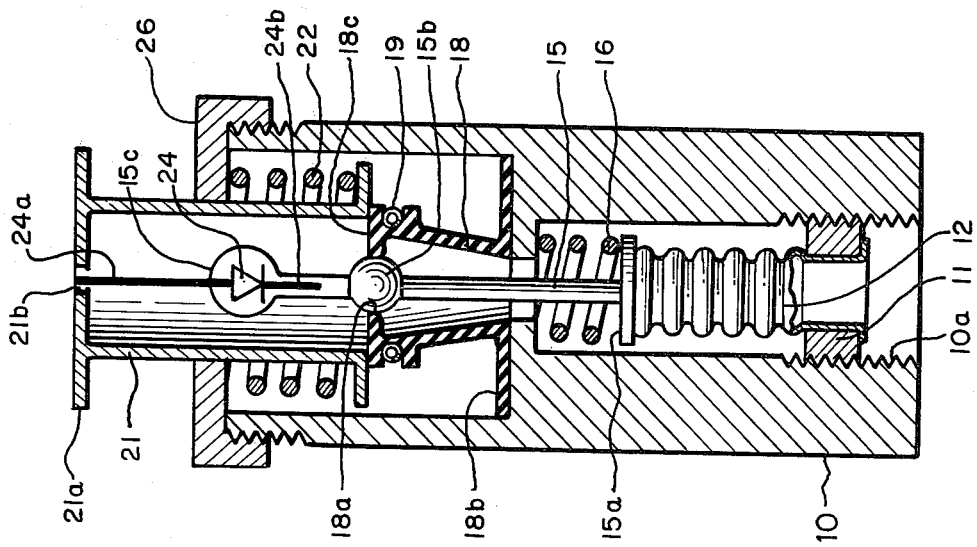

Consideration will initially be given to the construction of the passive transponder shown in FIGS. 2, 3 and 4. The cylindrical-shaped base portion 10 of the transponder (preferably made of metal) may be inserted through and affixed to an opening in the rim of a wheel such that the lower part of base 10 will be within the air chamber formed by the tire and the wheel rim, thereby being in a position to sense the tire air pressure. Alternatively, the transponder could be appropriately so that the internal threads 10a would facilitate screwing of the transponder to the external threads of the conventional valve stem on the tire. Actually, the transponder could even be built into the sidewall of the tire. The transponder will function properly whether the tire is stationary or is rotating at a high RPM.

Plug 11, which is affixed to metal bellows 12, is adjusted in accordance with the desired normal air pressure range for the particular tire to be monitored. Assume, for example, that the illustrated transponder is appropriately calibrated by adjusting plug 11 for a desired tire pressure of 32 psi ±2 psi. The normal range will thus have a width of 4 psi. When the pressure is in that range, the air pressure within bellows 12, and hence on bottom portion 15a of stem assembly 15, will be balanced by coil spring 16 and the stem assembly will be in the position shown in FIG. 2. In this normal position of assembly 15, a spherical- or ball-shaped portion 15b of the assembly lies within an opening 18a of a chuck 18, made of a suitable resilient material such as rubber. The bottom portion 18b of chuck 18 is secured to base 10. Opening 18a is normally considerably smaller than ball-shaped portion 15b so in the FIG. 2 position of assembly 15 the ball 15b (which may be solid in construction) pushes the top portion 18c of chuck 18 radially outward against the spring pressure of circular coil spring 19. With the top portion 18c spreads out as shown in FIG. 2, cylindrical-shaped electromagnetic shield 21 is held in a relatively high position by the top portion 18c and cannot be lowered by the spring pressure of coil spring 22.

Stem assembly 15 also includes a ball-shaped portion 15c (which may be constructed of glass) for holding and supporting the semiconductor diode 24 of the passive transponder. The diode has metallic leads 24a and 24b connected to its anode and cathode respectively and these leads normally function as antennas for receiving and re-radiating signals. As will be made apparent, however, conductor 24b will always be shielded from radiation so it will be ignored with respect to reception and retransmission. Conductor 24a, on the other hand, will serve as the antenna for diode 24 and thus preferably will be constructed of rigid, self-supporting metal having an appropriate cross-section.

From the positions of shield 21 and stem assembly 15 in FIG. 2 it is apparent that diode 24 and antenna 24a are completely shielded from radiation. Thus, if the transponder is interrogated when the tire air pressure is normal, diode 24 will not be excited and will not respond.

Assume now that the tire air pressure drops from the normal pressure of 32 psi down to, for example, 28 psi. Under those conditions coil spring 16 will push portion 15a of the stem assembly downward to establish a new balance between the coil spring and the lower air pressure within bellows 12, as illustrated in FIG. 3. Ball-shaped portion 15b is therefore withdrawn downward from opening 18a, whereupon circular coil spring 19 pushes the top portion 18c of chuck 18 radially inward so that its circular cross-section will be less than the circular cross-section within shield 21. Coil spring 22 therefore pushes shield 21 downward until its upper lip 21a engages the cap 26 which is screwed on to the top of base 10. With shield 21 retracted or telescoped into base 10 as shown in FIG. 3, antenna 24a will extend through opening 21b and will be well exposed to any incident radiation.

In the FIG. 4 condition of the transponder it is assumed that the tire air pressure is above the normal range (30-34 psi). Assume, for example, that the air pressure is 37 psi. Portion 15a will therefore be pushed upward to a new equilibrium point, as a result of which ball-shaped portion 15b will be positioned above chuck 18 and the chuck will be squeezed by spring 19, thereby permitting shield 21 to drop down to its retracted position. Antenna 24a, under those high pressure conditions, will thus be even more exposed than under the low pressure conditions illustrated in FIG. 3.

Of course, while shield 21 is moved in the illustrated embodiment when the tire air pressure either drops below normal or increases above normal, the shield may be fixed in position at all times and only the antenna moved.

Figure 1:
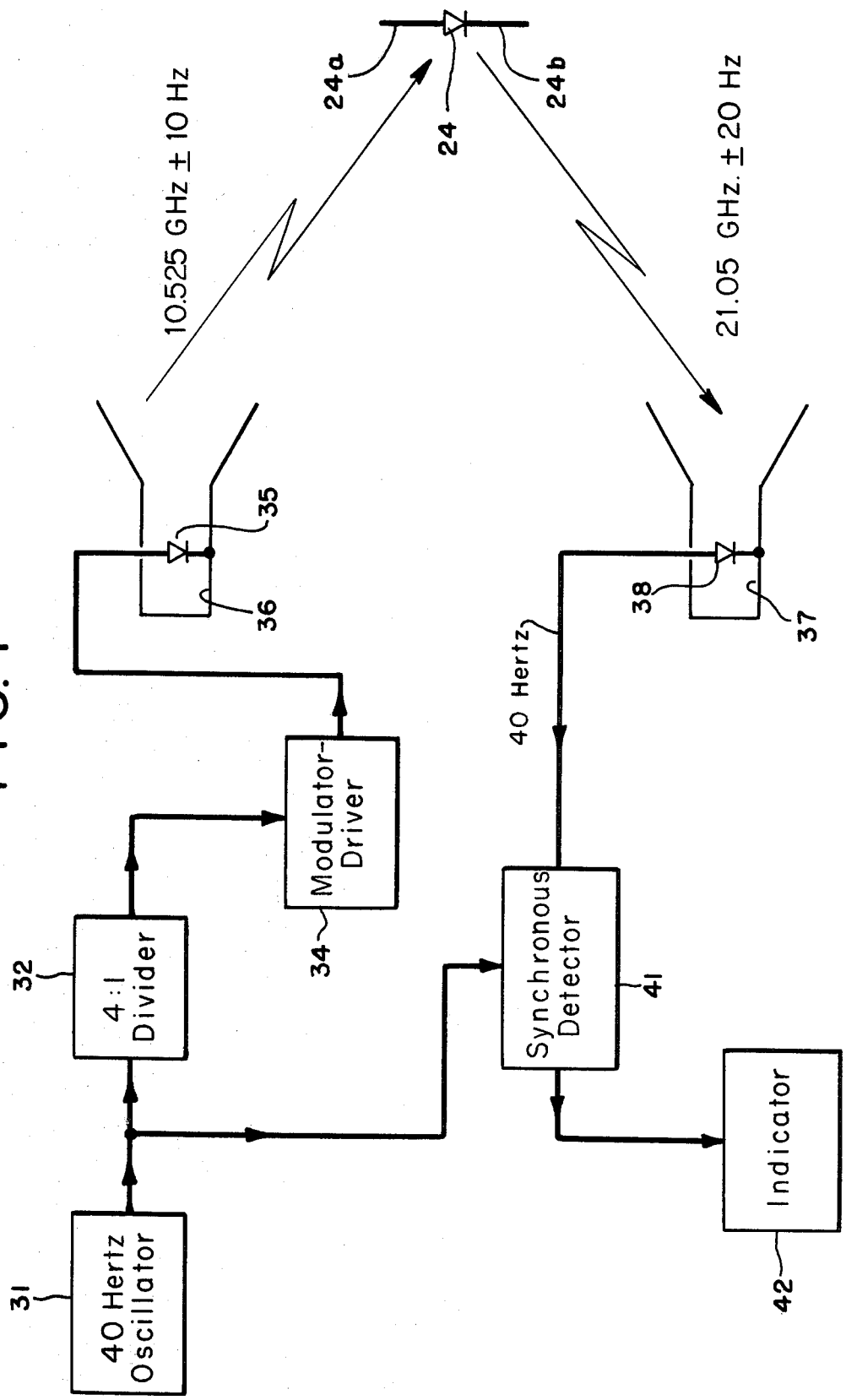
FIG. 1 schematically illustrates the electrical components of an interrogating system constructed in accordance with the invention, the figure showing only the diode and antenna of the passive transponder.

A suitable transmitting and receiving arrangement for interrogating the condition of the passive transponder, shown in FIGS. 2, 3 and 4, is illustrated in FIG. 1. Of course, this circuitry would be located in the vehicle whose tire air pressure is being monitored. In FIG. 1, a 40 hertz signal produced by an oscillator 31 is divided down by divider 32 to provide a 10 hertz modulating signal for modulator-driver 34, the output of which drives a gunn diode 35. Preferably, cavity 36 is tuned to 10.525 gigahertz or $10.525 \times 10^9$ hertz. Hence, the transmitted signal will comprise a carrier wave of a frequency 10.525 gigahertz with sidebands of ±10 hertz. When the tire air pressure is above or below the desired normal range, antenna 24a extends out of opening 21b and will be exposed to the electromagnetic radiation emmanating from the transmitting antenna. As is well known in the art, a diode is excited by and responds to such incident radiation and generates, for retransmission from its leads, a series of signal components having frequencies related to the received signals. Among those signals regenerated by diode 24 (which is preferably a schottky diode) are the second harmonic signals of the signals radiated from the transmitter. It is these second harmonic signals (21.05 gigahertz ±20 hertz) that will be selected by the receiving antenna. Cavity 27 will therefore be tuned to 21.05 gigahertz. Diode 38 (which may also be a schottky diode) serves as a mixer for beating the three received signals, namely 21.05 gigahertz, 21.05+20 hertz, and 21.05−20 hertz with each other. A 40 hertz beat signal will therefore be produced by mixer diode 38 when antenna 24a is exposed to permit diode 24 to respond to the radiation received from the transmitter. The presence of the 40 hertz beat signal will be detected in conventional manner by synchronous detector 41, which in turn produces an output for actuating indicator 42 to provide a visual display on the vehicle's dashboard to indicate to the driver that the tire air pressure is abnormal. Although not shown, a preamplifier using a biasing signal in conjunction with a mixer diode may be used to enhance the signal coming from diode 24.

While a particular embodiment of the invention has been shown and described, modifications may be made, and it is intended in the appended claims to cover all such modifications as may fall within the true spirit and scope of the invention.

I claim:

1. An interrogating system for remotely monitoring the air pressure in a tire mounted on a wheel of a vehicle, comprising:
    a passive transponder attached to the wheel and including a semiconductor diode having anode and cathode elements; a relatively rigid, self-supporting metallic conductor directly connected to and extending from one of the diode's elements to provide an antenna for the diode; sensing means for sensing the air pressure within the tire; a movable electromagnetic shield for the antenna; and means controlled by said sensing means for positioning said shield, with respect to the antenna and in response to the sensed tire air pressure, so that the shield surrounds the antenna when the tire air pressure is within a predetermined desired normal range thereby shielding the antenna from radiation, and so that the antenna extends out of the shield and is exposed to radiation when the sensed tire air pressure is either above or below the desired normal range;
    transmitting means in the vehicle for transmitting electromagnetic radiation to said passive transponder to effectively interrogate said transponder, said diode responding to the received radiation, when said antenna is exposed, and generating a response signal which is retransmitted from said antenna;
    and receiving means in the vehicle for receiving said response signal and for producing therefrom an output for controlling an indicator to provide an indication to the driver of the vehicle that the tire air pressure is outside of the desired normal range.

2. An interrogating system according to claim 1 wherein said electromagnetic radiation is a radio frequency signal comprising an amplitude modulated carrier wave having a preselected carrier frequency, and wherein said response signal comprises an amplitude modulated carrier wave having a carrier frequency which is a multiple of said preselected frequency.

3. An interrogating system according to claim 1 wherein said electromagnetic radiation comprises an amplitude modulated radio frequency signal, wherein said response signal comprises the second harmonic of the amplitude modulated radio frequency signal, and wherein said receiving means detects and responds to modulation components in said response signal.

4. An interrogating system according to claim 1 wherein said receiving means includes a mixer diode for beating the modulation components of the response signal with each other to produce a beat signal having a predetermined frequency, and a synchronous detector for detecting the presence of the beat signal thereby detecting the existence of abnormal tire air pressure, said indicator being controlled by the output of the synchronous detector and providing a visual display on the vehicle's dashboard to indicate to the driver that the tire air pressure is outside of the desired normal range.

5. An interrogating system according to claim 1 wherein said electromagnetic shield shields said semiconductor diode from radiation at all times regardless of whether the tire air pressure is normal or abnormal.

6. An interrogating system according to claim 1 wherein said transmitting means includes a gunn diode and wherein said semiconductor diode is a schottky diode.

* * * * *

UNITED STATES PATENT AND TRADEMARK OFFICE
CERTIFICATE OF CORRECTION

PATENT NO. : 4,363,020
DATED : December 7, 1982
INVENTOR(S) : Harry J. Venema

It is certified that error appears in the above—identified patent and that said Letters Patent is hereby corrected as shown below:

Column 4, line 47, cancel "claim 1" and insert -- claim 3 --.

Signed and Sealed this

Twenty-second Day of February 1983

[SEAL]

Attest:

GERALD J. MOSSINGHOFF

Attesting Officer   Commissioner of Patents and Trademarks